United States Patent
Elings (12)

(10) Patent No.: US 6,353,221 B1
(45) Date of Patent: Mar. 5, 2002

(54) METHOD AND APPARATUS FOR CLEANING A TIP OF A PROBE OF A PROBE-BASED MEASURING INSTRUMENT

(75) Inventor: Jeffrey R. Elings, Santa Barbara, CA (US)

(73) Assignee: Veeco Instruments Inc., Plainview, NY (US)

( * ) Notice: Subject to any disclaimer, the term of this patent is extended or adjusted under 35 U.S.C. 154(b) by 0 days.

(21) Appl. No.: 09/240,713

(22) Filed: Jan. 29, 1999

(51) Int. Cl.$^7$ ................................................ G01N 13/16
(52) U.S. Cl. ........................................ 250/306; 250/307
(58) Field of Search ........................... 250/423 F, 306, 250/307

(56) References Cited

U.S. PATENT DOCUMENTS

| | | | |
|---|---|---|---|
| 4,592,894 A | * 6/1986 | Panitz et al. | 250/423 F |
| 5,652,428 A | * 7/1997 | Nishioka et al. | 250/306 |
| B15,308,974 | 1/1998 | Elings et al. | 250/234 |
| B15,418,363 | 1/1998 | Elings et al. | 250/306 |

OTHER PUBLICATIONS

Nanoindentation and Nanoscratching with SPMs for Nano-Scope™ Version 4.32 Software, Elings Digital Instruments, Support Note No. 225, Rev. F, 1998.
Determination of SPM Tip Shape Using Polystyrene Latex Balls, Peter Nagy et al., EMAS'95 4$^{th}$ European Workshop on Mod. Dev. & Applcations in Microbeam Analysis, 1995.

* cited by examiner

*Primary Examiner*—Bruce Anderson
(74) *Attorney, Agent, or Firm*—Nilles & Nilles SC (57) ABSTRACT

A high degree of measurement reproducibility is assured for the life of the tip of a probe-based instrument such as an atomic force microscope (AFM) by periodically operating the instrument in a tip cleaning mode to remove contaminants from the tip. The instrument is operated to interrupt the scanning operation and cause the probe to interact with the cleaning medium so as to remove contaminants from at least the pointed end portion of the tip. Tip cleaning may be achieved, for example, by ramming the tip vertically into the sample itself or into another cleaning medium located adjacent the sample. Alternatively, the tip can be moved laterally over the sample, a sticky material, a brush-like material, a ribbed material, or another material having surface characteristics that remove contaminants from the tip.

44 Claims, 9 Drawing Sheets

METHOD AND APPARATUS FOR CLEANING A TIP OF A PROBE OF A PROBE-BASED MEASURING INSTRUMENT

BACKGROUND OF THE INVENTION

1. Field of the Invention

The invention relates to probe-based measuring instruments, such as scanning probe microscopes (SPMs), that measure sample surface characteristics by monitoring interaction between a tip-bearing probe of the instrument and the sample surface. More specifically, the invention relates to a method and apparatus for improving reproducibility of data acquisition by operating the instrument to clean a contaminated tip.

2. Discussion of the Related Art

Probe-based instruments are well-known for obtaining data relating to the surface characteristics of samples. These instruments include stylus profilometers and scanning probe microscopes (SPMs) including atomic force microscopes (AFMs) and magnetic force microscopes (MFMs). The probes of many of these instruments include a pointed tip that interacts with the sample to provide an indication of the measured surface sample characteristic(s). For example, in the case of an AFM, the probe comprises a cantilever and a tip. One end of the cantilever is mounted on a support such as an XYZ actuator assembly, and the tip is mounted on the opposite, free end of the cantilever. The tip, which usually is generally pyramidal in shape, has a base fixed to the free end of the cantilever and a pointed end portion located opposite the base. In use, the pointed end portion of the tip is brought very near to or into contact with the surface to be examined so as to interact with the sample, and the effects of tip-sample interaction on probe motion are monitored and used to provide a feedback signal that serves both to permit adjustment of probe operation and to provide an indication of the measured sample surface characteristic(s). AFMs of this type are disclosed, for example, in U.S. Pat. Nos. 5,226,801; 5,412,980; 5,519,212; and 5,418,363, all of which issued in the name of Elings et al. and the disclosures of all of which are hereby incorporated by reference by way of background material.

Precise AFM measurements require the use of a sharp tip, i.e., one having a minimal pointed end portion diameter. Dull tips may not be able to probe narrow, deep features in a sample. Moreover, sharp sample features may appear broadened in AFM images produced with dull tips. These problems are exacerbated by the fact that even relatively sharp tips become dull as they wear during repeated measurement cycles. Tip manufacturers therefore usually seek to balance precision with reproducibility. The ideal tip is as sharp as is necessary to obtain the required resolution for the desired application but is not so sharp that it wears too rapidly. Hence, considerable effort has been expended in the design and manufacture of tips having a relatively narrow range of effective pointed end portion radii.

It has been observed that, during scanning, an AFM tip can become contaminated by collecting foreign matter along its length and particularly on its pointed end portion. Tip contamination is thought to come from a variety of sources including the ambient atmosphere, the operator during handling, debris on the surface of the sample, and from the formation of oxides during measurement. Tip contamination may also result from the production of particles during scanning due to scratching or wear of the sample or the tip. Sample-based contamination is becoming increasing problematic because there is a growing trend to make tips from a relatively hard, wear-resistant material such as diamond or a diamond-like-carbon substance in order to extend tip life. When these hard tips are used on a relatively soft sample, such as gold or aluminum, the sample tends to wear more than it would if it were to interact with a soft tip, resulting in the production of relatively high quantities of sample-based contaminants. Moreover, the relatively long life of hard tips provides them with a greater opportunity to accumulate contaminants than is experienced by soft tips that must be replaced more frequently.

Tip contamination can severely degrade the reproducibility of the acquired data. Most contaminants increase the effective radius of the pointed end portion of the tip, resulting in an expansion of the area of interaction between the tip and the sample and a corresponding reduction in the resolution and accuracy of the measurement in the same manner that a dull tip reduces accuracy and measurement. Conversely, contaminants can sometimes extend below the pointed end portion of the tip so as to provide a reduced effective tip end portion radius. The resultant narrowed area of interaction between the tip and the sample can provide a heightened resolution that remains for as long as the contaminants remain below the pointed end portion of the tip without being worn away or wiped off. In either event, measurement resolution and accuracy can vary dramatically from scan to scan and even within scans depending upon the amount and location of contaminants on the tip.

Tips have been cleaned manually in the past by manually immersing the tip in a solvent or by rubbing the tip with a substance, such as a fabric, hair, or wood, that is softer than the tip. Cleaning by hand is inconvenient at best, is of questionable effectiveness, and risks tip damage or destruction if the tip is rubbed too aggressively. Cleaning by hand is also impractical in many instruments, particularly if one wishes to clean the tip without removing the probe from the instrument.

A need therefore has arisen to incorporate measures into an AFM or other probe-based measuring instrument to permit the tip of the probe to be cleaned, preferably automatically, thereby increasing the reproducibility of the instrument's measurements over a longer period of time.

OBJECTS AND SUMMARY OF THE INVENTION

It is therefore a first principal object of the invention to provide a method of cleaning a tip of a probe-based instrument such as an AFM by operating the instrument in a tip cleaning mode.

Another object of the invention is to provide a method that meets the first principal object and that can be performed automatically, preferably intermittently or as required during data acquisition.

In accordance with a first aspect of the invention, these objects are achieved by providing a method of operating a probe-based instrument in a tip cleaning mode that includes acquiring data in the usual manner and, during a scan operation or after its completion, operating the instrument to cause the probe to interact with a cleaning medium so as to remove contaminants from at least the pointed end portion of the tip. If the material of the sample being measured is softer than the material of the tip, the cleaning medium can constitute the sample itself, and the tip can be cleaned simply by operating the instrument to cause the tip to interact with the sample so as to remove contaminants from the tip or at least forcing them to a level above the pointed end portion of the tip that presents the tip's effective radius.

If the sample is not considerably softer than the tip, or if other considerations prevent tip cleaning using only the sample itself, the cleaning medium can take the form of a separate object located adjacent the sample. In this case, the instrument can be controlled to move the probe from the test region over the sample to a cleaning region over the separate cleaning medium and to effect the necessary cleaning interaction between the tip and the cleaning medium.

Whether the cleaning medium is the sample or another medium, the cleaning interaction between the tip and the cleaning medium, for example, may take the form of a ramming action, a wiping action, a combination of both, or any other action resulting in contaminant removal.

In accordance with another aspect of the invention, the instrument includes an AFM, in which case the probe includes a cantilever having a fixed end and a free end to which the tip is attached.

Another object of the invention is to provide a probe-based measuring instrument configured to clean the tip of its probe as required.

Other objects, features and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

1. Resume

Pursuant to the invention, a high degree of measurement reproducibility is assured for the life of the tip of a probe-based instrument such as an atomic force microscope (AFM) by periodically operating the instrument in a tip cleaning mode to remove contaminants from the tip through appropriate interaction between the tip and a cleaning medium. The cleaning medium may comprise the sample itself or a separate medium located adjacent the sample. The cleaning interaction may comprise a ramming action, a wiping action, a combination of both, or any other interaction that removes contaminants from at least the pointed end portion of the tip.

2. Process Overview

The present invention is applicable to any probe-based measuring instrument the probe of which includes a tip that contacts or otherwise interacts with a sample under test. These instruments include some profilometers as well as SPMs including AFMs. Hence, while the invention is described primarily in conjunction with cleaning a tip of an AFM for the sake of convenience, it is applicable to a wide range of other probe-based measuring instruments as well.

Figure 1:
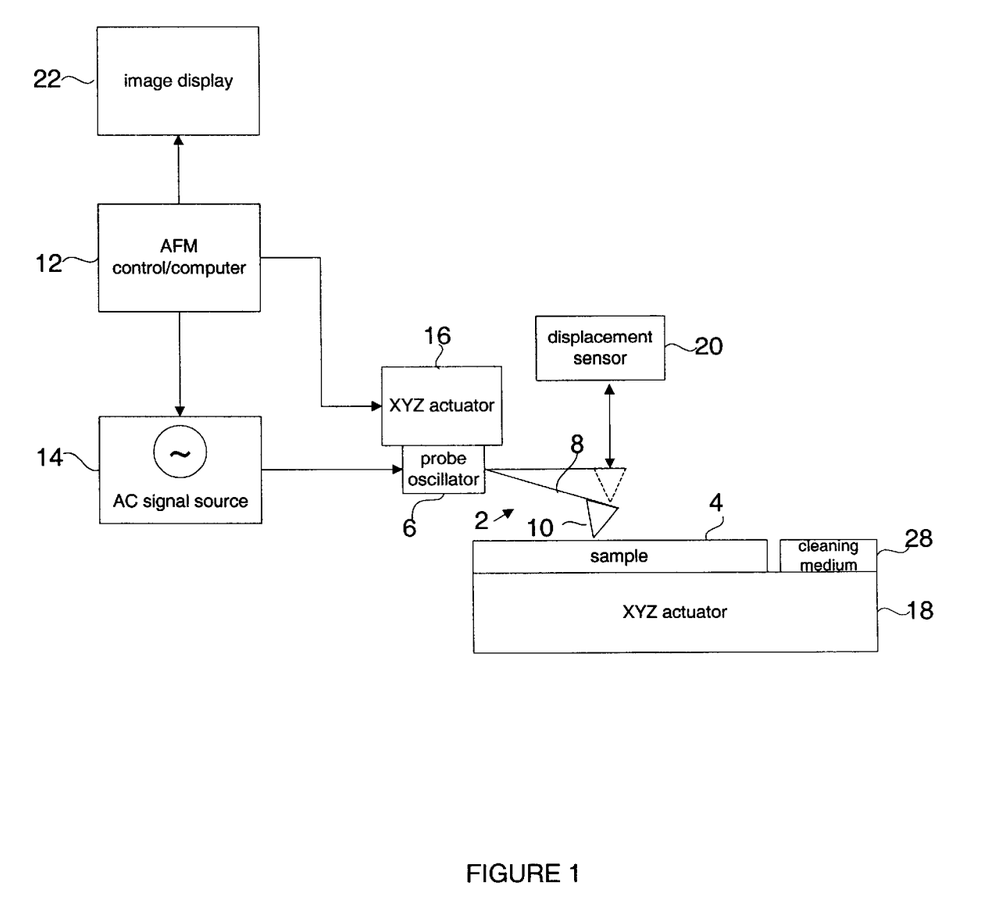
FIG. 1 is a schematic representation of an AFM operable in a tip cleaning mode.

Referring to FIG. 1, an AFM to which the invention is applicable includes a probe 2 which scans a sample 4 by constant, intermittent, or other interaction with it. The probe 2 can be oscillated by a tip oscillator 6 to drive the probe 2 appropriately, usually at or near the probe's resonant frequency. An electronic signal is applied, under control of an AFM control/computer 12, from an AC signal source 14 to the oscillator 6 to drive the probe 2 to oscillate at a free oscillation amplitude $A_o$ (assuming that the AFM is operating in an oscillating mode). The probe 2 can also be driven towards and away from the sample 4 using a suitable XYZ actuator assembly 16 which is also controlled by the computer 12. It should be noted that rather than being configured for driving the probe 2 towards the sample 4 as illustrated, the AFM could be configured for mounting the sample 4 on an actuator assembly such as XYZ actuator assembly 18 so that the sample 4 can be translated relative to the probe 2. For the sake of convenience, the AFM will be described primarily in conjunction with effecting relative probe/sample displacement by translating the probe 2 while holding the sample 4 stationary. However, it should be understood that the invention is equally applicable to systems in which the probe 2 remains stationary while the sample 4 moves, and to systems in which both the probe and the sample move.

Relative probe/sample movement is monitored by a suitable displacement sensor 20 that may, for example, employ a laser and photodetector as well as other components. As is known in the art, signals from the sensor 20 can be used to determine probe operational parameters such as oscillation amplitude, frequency, and phase, as well as probe-sample spacing, and other parameters, and so measure the probe-sample interaction. The computer 12 can use this measurement as a feedback signal to control the vertical probe-sample position via the actuator assembly 16 to keep the probe-sample interaction constant as the actuator assembly 16 scans the probe 2 horizontally over a test region of the sample surface. The test region typically, but not necessarily, will comprise a scanned area having both X and Y components on the sample surface. In this feedback mode, the voltage or signal applied to the Z (vertical) portion of the actuator assembly 16 is representative of a surface characteristic of interest such as surface topography. Recording this signal as a function of scan position yields a data scan representative of the surface characteristic of interest. Finally, a suitable image display device 22 is connected to the computer 12 and displays a humanly-discernible image (such as a video image) of the data scan.

Still referring to FIG. 1, the probe 2 includes 1) a cantilever 8 having a base fixed to the oscillator 6 and having a free end, and 2) a tip 10 mounted on the free end of the cantilever 8. The tip 10 is made of a relatively hard material such as diamond or a diamond-like substance, and the cantilever 8 is made from a relatively stiff material such as stainless steel. However, the invention is applicable to softer tips and to cantilevers or other supports that are formed from silicon or another material that is more flexible than stainless steel.

Figure 2A:
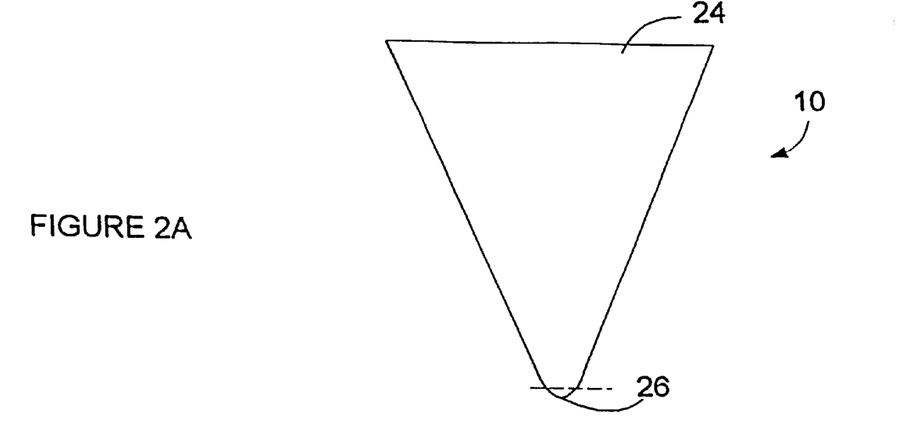
FIG. 2A schematically illustrates a tip of the probe of the AFM of FIG. 1.
Figure 2B:
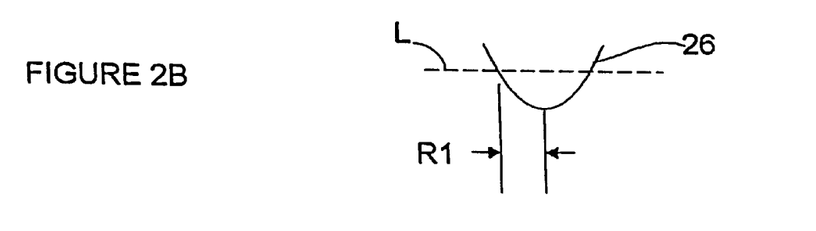
FIG. 2B schematically illustrates the pointed end portion of the tip of FIG. 2A, illustrating the effective tip radius of a clean tip.
Figure 2C:
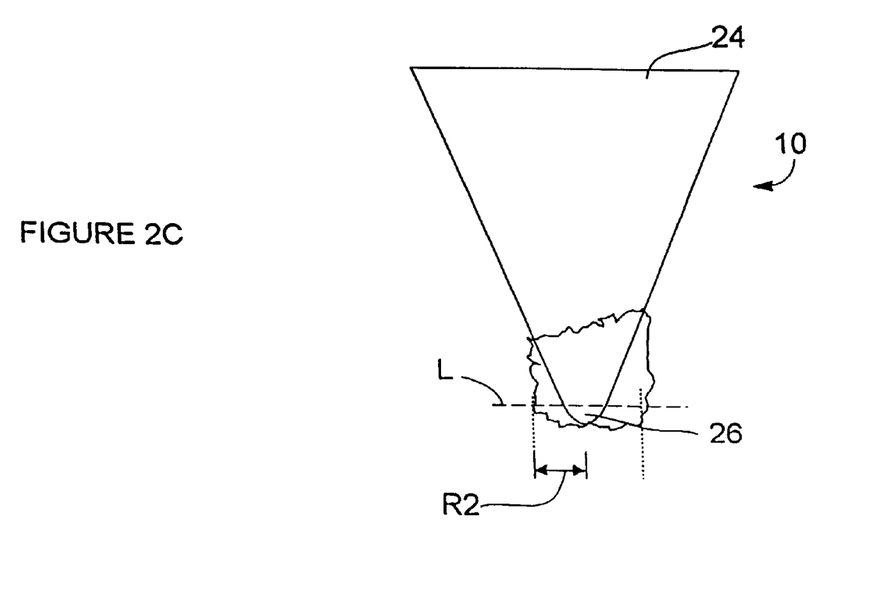
FIG. 2C schematically illustrates the pointed end portion of the tip of FIG. 2A, illustrating the effective tip radius of a contaminated tip.

Referring to FIGS. 2A–2C, the tip 10 includes a base 24 configured for mounting on the free end of the cantilever 8 and a pointed end portion 26 located opposite the base 22. The tip 10 is generally pyramidal in shape so as to taper continuously from the base 24 to the lowest point on the pointed end portion 26. In use, only the pointed end portion 26, denoted by the area beneath the line l, contacts or otherwise interacts with the sample 4 during AFM operation. As seen in FIG. 2B, portion 26, which typically has a length of about 12–20 nm, has a maximum effective radius of R1 when it is clean. However, as seen in FIG. 2C, if debris or other contaminants lodge onto the pointed end portion 26, the effective tip radius R2 may become substantially greater than R1, leading to less precise images and degraded image reproducibility. (As discussed in the Background section above, contaminants may also decrease the effective radius of the pointed end portion 26 if they extend below the bottom of the tip 10, thereby artificially enhancing image resolution. In either event, image reproducibility is degraded).

The AFM can be operated in a tip cleaning mode to remove contaminants from at least the bottom end portion 26 of the tip. When operating in the tip cleaning mode, the AFM cleans the tip 10 by causing it to interact with a cleaning medium 28 so as to clean at least the pointed end portion 26 of the tip 10. The cleaning medium 28 may comprise either a portion of the sample 4 located either in or away from the test region or a separate material located adjacent the sample 4.

Figure 3:
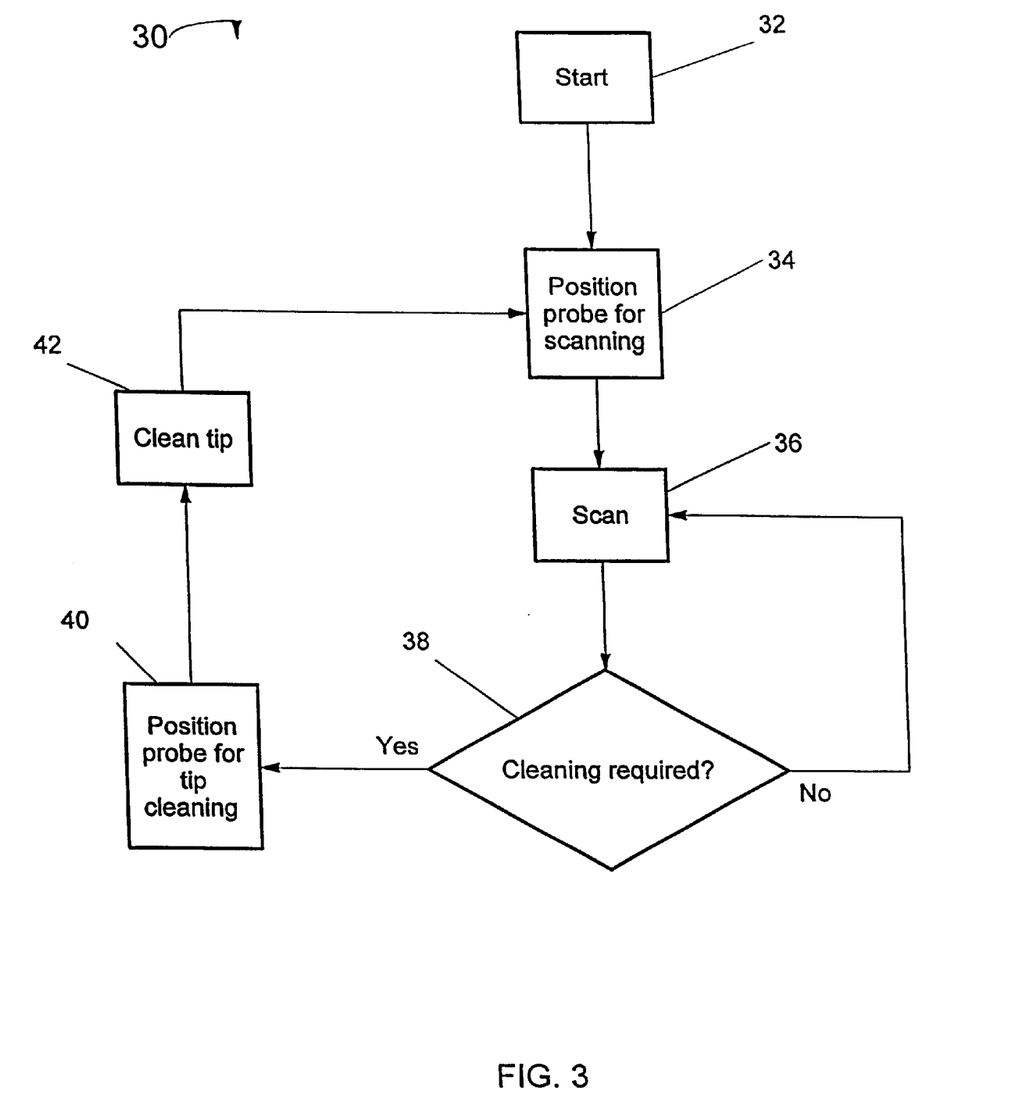
FIG. 3 is a flowchart illustrating a generic method of operating an AFM in a tip cleaning mode.

Turning now to FIG. 3, a generic process 30 for cleaning the tip proceeds from Start (step 32) to step 34 in which the computer 12 controls the actuator assembly 16 to position the probe 2 over the scanned area of the sample 4. Data acquisition is then initiated in step 36 by operating the actuator assembly 16 and the oscillator 6 (if the AFM is operated in oscillating mode) to obtain data concerning surface topography or another surface sample characteristic as the probe 2 scans over the surface of the sample 4. In step 38, the process 30 determines whether or not the tip 10 is to be cleaned. This determination can be made in a variety of ways including automatically as detailed below in conjunction with FIG. 4, manually by discerning a change in image quality, or simply via a timing function under which the tip 10 is cleaned periodically without actually ascertaining whether or not it is contaminated. If cleaning is not required, scanning continues uninterrupted in step 36. If cleaning is required, the computer 12 is operated, either automatically or under manual control, to transmit a signal to the XYZ actuator assembly 16 in step 40 to interrupt the scanning function.

Then, in step 42, the computer 12 transmits a control signal to the XYZ actuator assembly 16 to cause the probe 2 to interact with the cleaning medium 28 so as to remove contaminants from at least the pointed end portion 26 of the tip 10. This interaction may take many forms, including either singular or repeated vertical ramming in the Z direction or wiping in the X and/or Y direction, so long as contaminants are removed from at least the pointed end portion 26 of the tip 10. Cleaning may take place either via interaction with the sample or with interaction with a separate cleaning medium. If the sample is used for cleaning, cleaning may take place either in a separate cleaning region of the sample or in the test region. If cleaning takes place within the test region of the sample, cleaning may be performed without interrupting the scan operation. In this case, it is only necessary to alter probe motion from that required to acquire data to that required to clean the tip. For instance, if data is being acquired in TappingMode, the cantilever deflection setpoint can be increased during the cleaning operation to increase the force with which the tip engages the sample. The tip may remain in intermittent engagement with the sample surface or, if the setpoint is raised enough, may move laterally across the sample surface without oscillating. TappingMode setpoint adjustment is discussed in more detail below in conjunction with FIGS. 8A–8C. Cleaning in this manner can substantially accelerate the process, and the false data acquired during the cleaning process can be discarded or simply ignored.

After the tip 10 is cleaned, the computer 12 controls the actuator assembly 16 to reposition the probe 2 for scanning in step 34 (assuming that cleaning takes place outside of the test region), and scanning is resumed in step 36 (assuming that scanning is interrupted for cleaning). The entire process 30 is performed without the operator having to remove the probe 2 from the AFM or to physically handle the tip 10.

Figure 4:
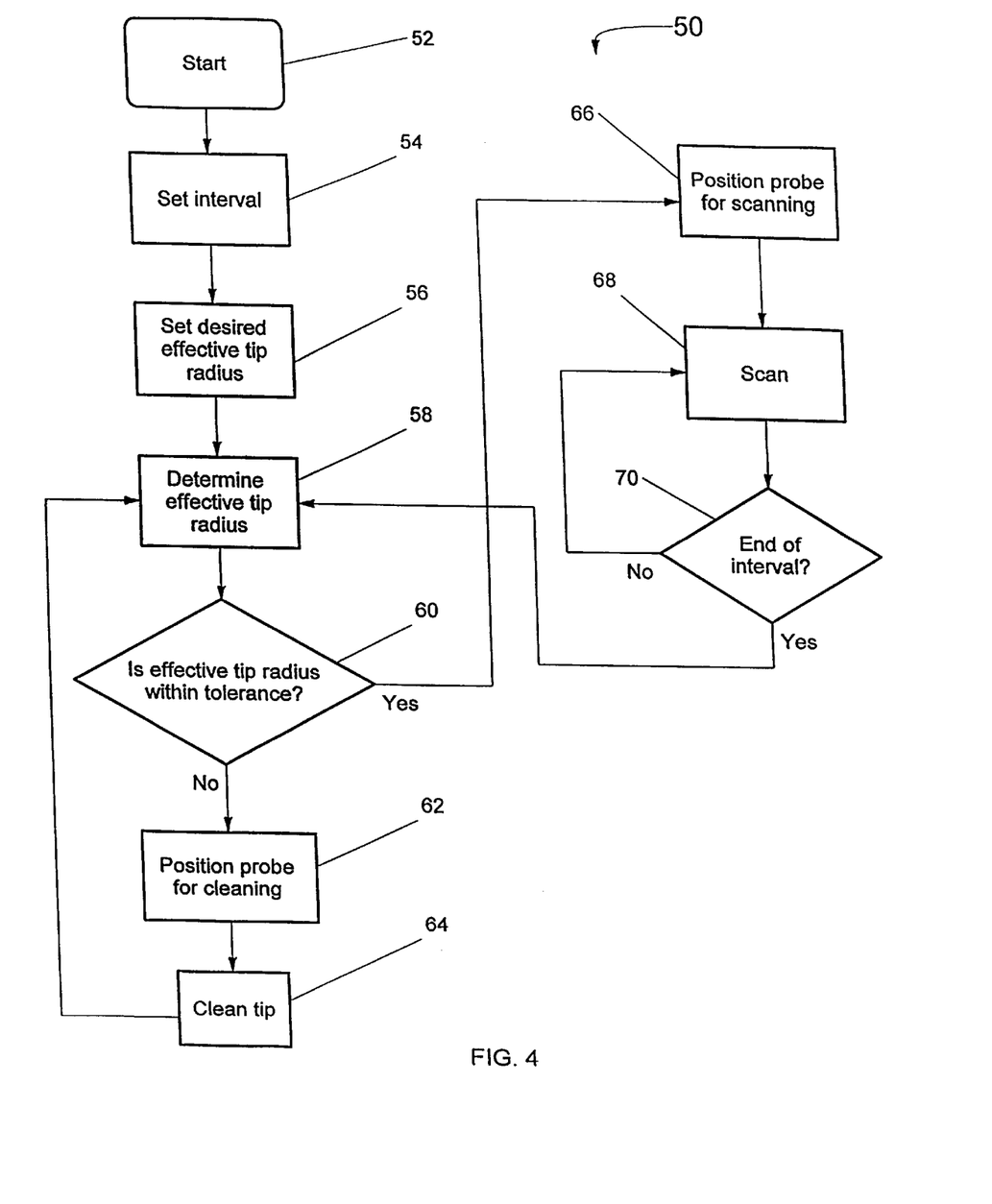
FIG. 4 is a flowchart illustrating a more detailed method of operating an AFM in a tip cleaning mode.

A more detailed example of a generic, fully automated tip cleaning procedure 50 is illustrated in FIG. 4. Under this fully automated procedure, the AFM periodically interrupts the scanning operation, determines whether the tip 10 needs to be cleaned, and cleans the tip 10. Specifically, the cleaning mode operation 50 proceeds from Start in step 52 to step 54 in which the operator sets a cleaning interval by suitable input into the computer 12. This interval typically will vary depending upon, among other things, the tip material, the sample material, and the operating environment. The operator also sets the desired effective tip radius in step 56, which also will depend on several factors including the tip material.

If tip cleaning is to be performed in a fully automatic mode in which the determination of whether the tip needs to be cleaned is made by the AFM rather than the operator, the next step in the procedure 50 is to determine the effective radius of the pointed end portion 26 of the tip 10 in step 58. This determination may be made by directly measuring the tip radius using another measuring instrument. Alternatively, the probe 2 can be moved away from the test area and placed in a position in which it scans a sample of known characteristics. In this case, an estimation of effective tip radius can be made by comparing the measured characteristics to the known characteristics. For instance, the known sample may take the form of a closely packed monolayer of small polystyrene latex balls, in which case the dependence of tip shape on the AFM image can be determined by comparing images of the monolayer to a real image acquired earlier using another instrument or a tip that is known to be clean. This technique is disclosed in greater detail in *Determination of SPM Tip Shape Using Polystyrene Latex Balls*, Nagy et al., 1997, the subject matter of which is hereby incorporated by reference.

Next, in step 60, the determined effective tip radius is compared to the desired effective tip radius to determine whether the effective tip radius is within tolerances and, hence, to determine whether the tip needs to be cleaned. If the answer to this inquiry is No, the probe 2 is positioned in the cleaning region in step 62 (as discussed in more detail in Section 3 below, if the cleaning medium is the sample, the cleaning region and the test region may be one and the same), and the tip 10 is cleaned in step 64 by causing it to interact with the cleaning medium 28, preferably using one or more of the techniques described in Section 3 below. The procedure 50 then returns to steps 58 and 60 to determine whether the cleaning operation was successful. If, on the other hand, the answer to the inquiry of step 60 is Yes, indicating that the tip 10 does not need to be cleaned, the probe 2 is positioned in the test region for scanning (step 66), and a raster scan or other known scanning operation is initiated in step 68 to acquire data in a known manner. At intervals during the scan operation that were set in step 54, the effective tip radius is ascertained (interrupting the scan operation if necessary), and the tip 10 is cleaned if it is determined that the tip radius is not within tolerances. The interval at which the tip radius is checked will vary from application to application. This interval may be as long as a complete scan, in which case a particular scan need not ever be interrupted, or may be as short as a few scan lines.

3. Exemplary Cleaning Techniques

As discussed briefly in Section 2 above, many techniques are available for cleaning the tip 10 using the AFM. Cleaning technique selection will be based on, among other things, operator preference, tip characteristics, and sample characteristics. It is also possible that two or more cleaning techniques can be used in conjunction with one another. For example, it may be desirable to first attempt to clean the tip 10 using a less aggressive cleaning technique that has little risk of tip damage and to then resort to a more aggressive cleaning technique if the less aggressive technique is unsuccessful.

Turning now to FIGS. 5A–5D, one possible tip cleaning technique involves the control of one or both of the actuator assemblies 16 and 18 to cause the tip to interact with a cleaning region of the sample to remove contaminants C from the pointed end portion 26 of the tip 10. The cleaning region is denoted by a portion 4' of the sample 4. Depending upon operator preference, the data acquisition mode of operation, and the cleaning mode of operation, the cleaning region my either be spaced from the test region as illustrated (the cleaning region and test region are shown as being conceptually divided by the phantom line S in FIGS. 5A–5D) or, as discussed above, may be located within the test region. This technique is usually applicable when the sample 4 is significantly softer than the tip 10 so that the tip 10 can be rammed into the sample 4 without damaging the tip 10. For instance, this technique can be quite effective if the tip 10 is formed from diamond or a diamond-like substance and the sample 4 is formed from a relatively soft material such as gold or aluminum. If, on the other hand, the sample 4 is not significantly softer than the tip or some other factor prevents the use of the sample as an effective cleaning medium, a separate, more acceptable cleaning medium 28 can be placed along side the sample 4 as illustrated in FIG. 1. This separate medium 28 could, for example, comprise a soft metal, a metalover-plastic laminate, or a plastic. The medium 28 also could comprise a liquid solvent such as acetene alcohol.

Figure 5A:
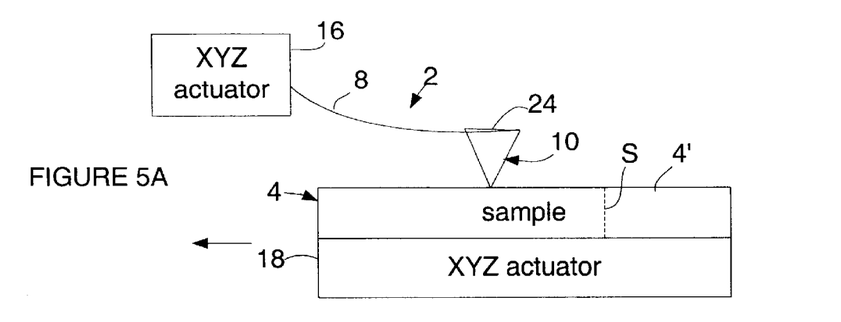
FIGS. 5A–5D schematically illustrate a tip cleaning process performed in accordance with a first embodiment of the invention.
Figure 5B:
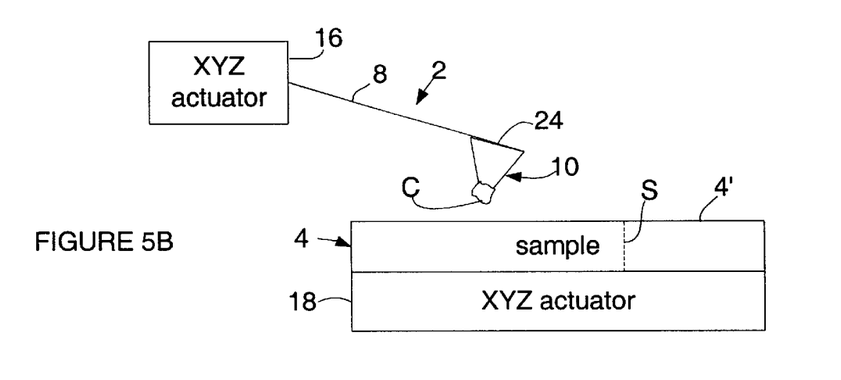
Figure 5C:
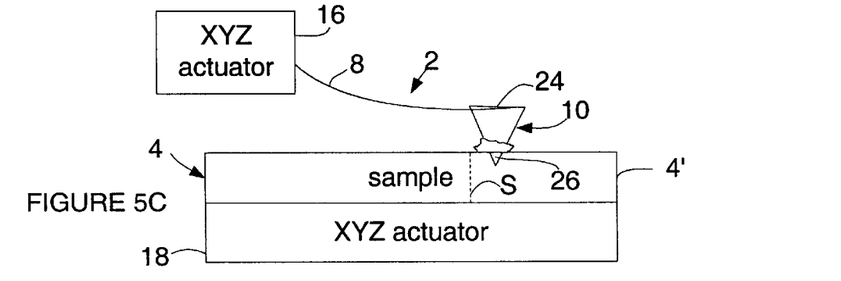
Figure 5D:
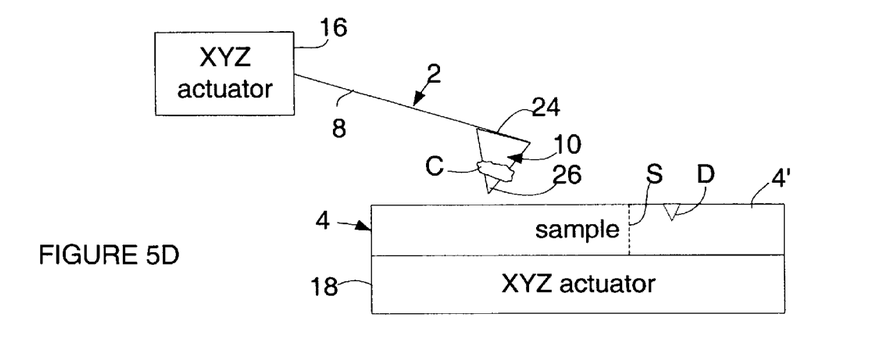

Referring again to FIGS. 5A–5D, one possible technique for cleaning the tip 10 is to drive it vertically into the cleaning medium (sample portion 4') while preventing lateral movement of the tip relative to the cleaning medium to form at least one and preferably multiple indentations at the same location on the surface of the cleaning medium. This technique involves removing the probe 2 from the location illustrated in FIG. 5A in which it is acquiring data, moving the probe 2 towards and then into the cleaning region (FIG. 5B), and ramming the contaminated tip 10 into the cleaning medium (FIG. 5C) so that the pointed end portion 26 of the tip 10 forms a dent (shown at D in FIG. 5D) in the cleaning medium. The shock of this ramming action may jar the contaminants C loose from the tip 10. At the least, the edges of the dent D wipe contaminants C up to a location above the pointed end portion 26 of the tip 10 as seen in FIG. 5D. The force with which the tip 10 is driven into the cleaning medium will vary with the hardness of the cleaning medium, and probe motion preferably is controlled to drive it into the cleaning medium while substantially preventing lateral (i.e., X and/or Y) movement between the tip and the cleaning medium. Preferably, probe ramming movement is controlled using a variation of the LiftMode procedure disclosed, for example, in U.S. Pat. Nos. 5,308,974 and 5,418,363 to Elings et al., both of which are incorporated by reference by way of background material. LiftMode operation includes setting of a scan size of a particular value, setting a tip-sample surface spacing at another value, and then controlling the probe motion to obtain the set values. The desired ramming effect can be achieved by setting the scan size to zero and by setting the lift height to a negative number of, for example, −20 nm. (It should be noted that the "cleaning dent" produced by driving a particular tip into a particular cleaning medium with a particular force is dependent largely upon the lever material and not on the tip's size. A relatively deep dent of about 20 nm is produced if the cantilever is made from a relatively stiff material such as stainless steel, whereas a shallower dent is produced if the cantilever is made from a more flexible material such as silicon nitride.) Repetitive ramming and consequent improved tip cleaning can, if desired, be achieved by operating the instrument in a well-known "hard tapping" mode in which the probe 2 is oscillated at a location close to the cleaning medium surface. This repeated ramming will knock contaminants C off from the tip 10, or at a minimum, will scrape those contaminants to a position on the tip that is above the pointed end portion 26.

Alternatively, a Tapping action may be accompanied by or replaced with lateral tip movement so that cleaning is achieved by vertical ramming, lateral wiping, or a combination of both.

Successful implementation of any of these techniques will remove sufficient contaminants from the pointed end portion 26 of the tip 10 to obtain an effective tip radius that is within acceptable parameters, and a scan operation can be resumed. This resumption is illustrated schematically in FIG. 5D, which illustrates the return of the probe 2 to the test region. Of course, if cleaning takes place within the scanned area as opposed to in a separate test region, there is no need to interrupt the scan operation and, accordingly, no need to resume scanning.

Figure 6A:
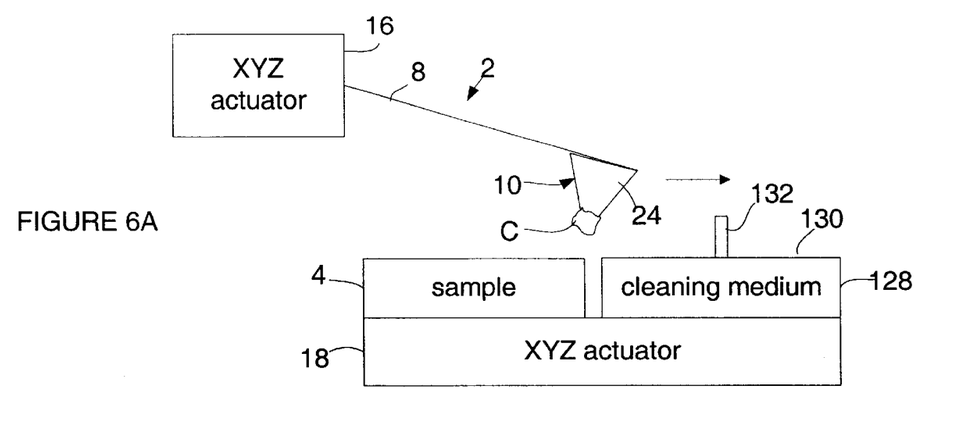
FIGS. 6A–6C schematically illustrate a generic tip cleaning process relying on a wiping action to clean the tip.
Figure 6B:
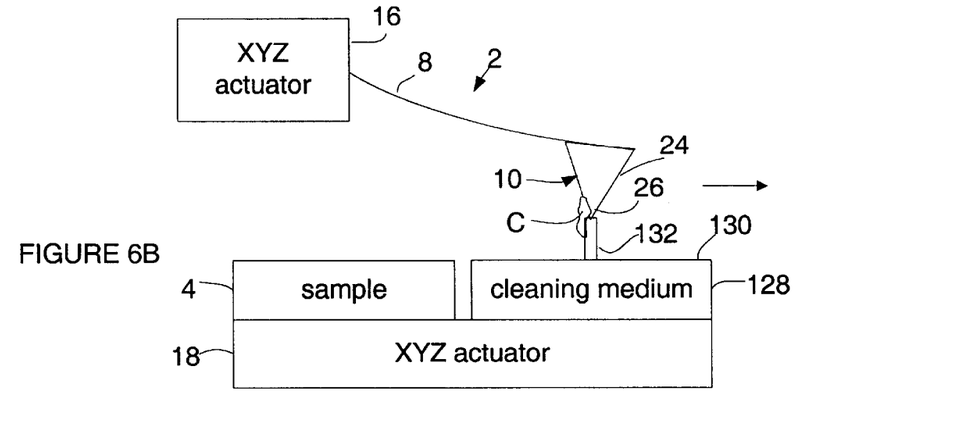
Figure 6C:
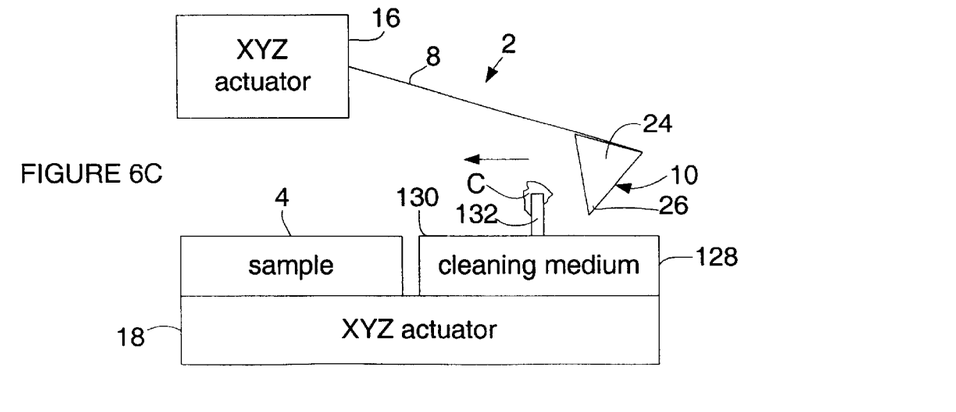
Figure 7A:
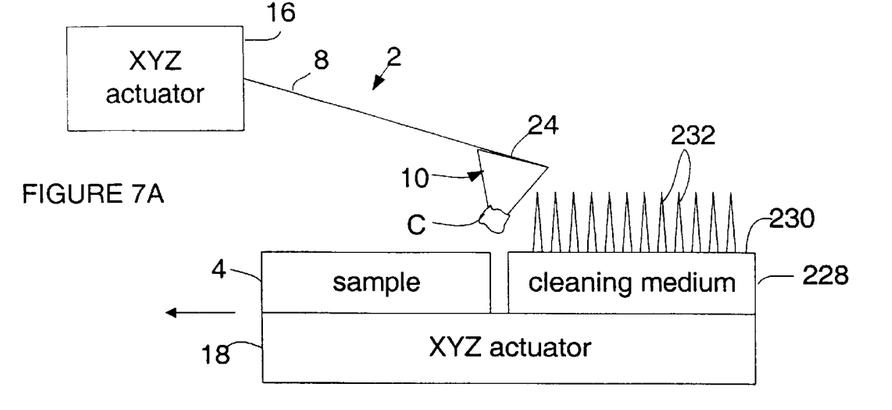
FIGS. 7A–7C schematically illustrate a first practical implementation of the embodiment of FIGS. 6A–6C.
Figure 7B:
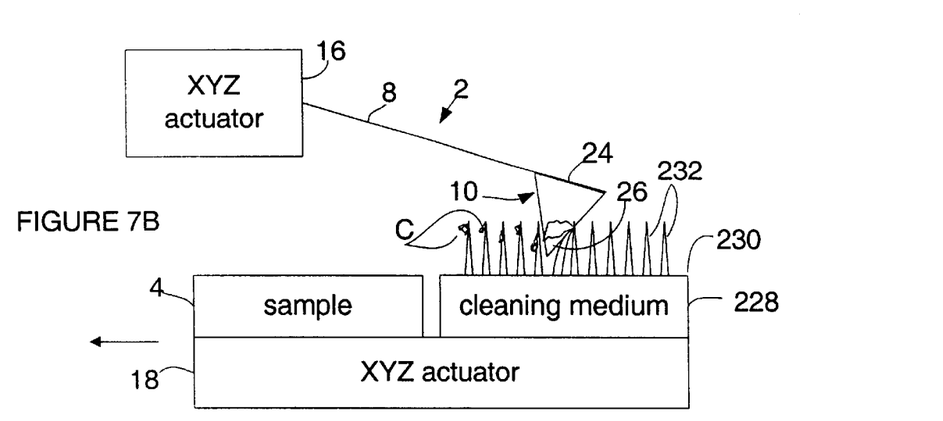
Figure 7C:
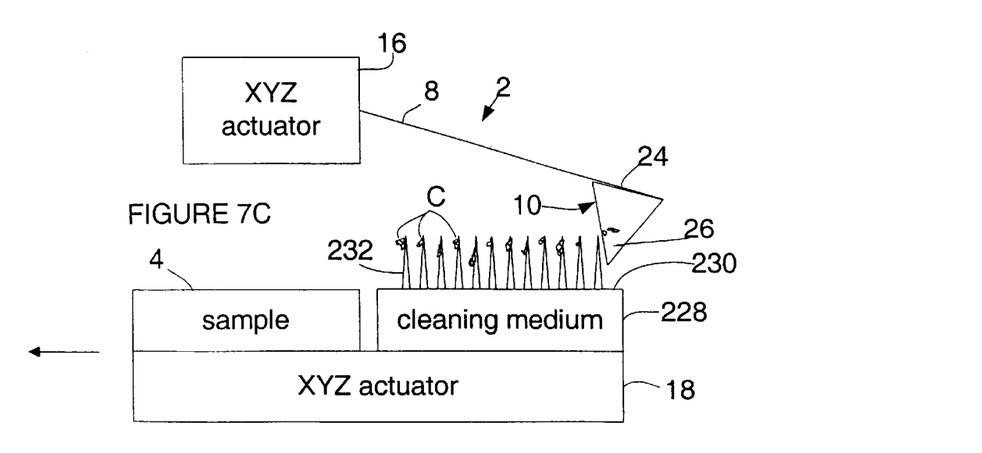

The tip 10 can also be cleaned by interaction with a separate cleaning medium located adjacent the sample. As with the previous example, this interaction may comprise either a wiping action, a ramming action, or a combination of both. For instance, the tip may be cleaned by wiping it laterally across protrusions or other surface features on a separate cleaning medium so as to scrape contaminants from the tip 10 during the back and forth relative motion between the tip 10 and the surface features on the cleaning medium. This technique is illustrated generically in FIGS. 6A–6C in which the cleaning medium 128 has a generic scraper 132 that extends upwardly from the surface 130 of the cleaning medium 128 and that is engaged by the tip 10 as the probe 2 is driven laterally relative to the surface 130 of the cleaning medium 128. This scraping or wiping motion can be achieved by operating the AFM in the well-known "contact mode" in which the actuator assembly 16 is controlled to drag the probe 2, without oscillation, back and forth across a surface. (However, heretofore, contact mode operation was used only for measurement, not for tip cleaning) A more practical application of this concept is illustrated in FIGS. 7A–7C in which the cleaning medium 228 comprises a brush-like object having bristles 232. The bristles 232 may be formed from any relatively flexible structure that extends upwardly from the surface 230 of the object. As seen in FIGS. 7B and 7C, as the probe 2 is scanned back and forth across the surface of the cleaning medium 228 in contact mode, sliding contact between the bristles 232 and the edges of the tip 10 scrape the contaminants C from the tip 10. If the microscope is being operated in TappingMode while imaging, it may be more convenient to not switch to contact mode to do the cleaning. Instead, the Z actuator could be moved to a position to guarantee that the tip is sliding in contact with the sample. For example, the Z actuator could be held at a position slightly lower than its last position throughout the scan. Alternatively, LiftMode could be used. If the topography is measured using TappingMode, and a negative lift height greater than the cantilever amplitude is used, the cantilever will be in constant contact with the sample during the lift scan. Tapping, TappingMode and LiftMode are trademarks of Veeco Instruments, Inc.

Figure 8A:
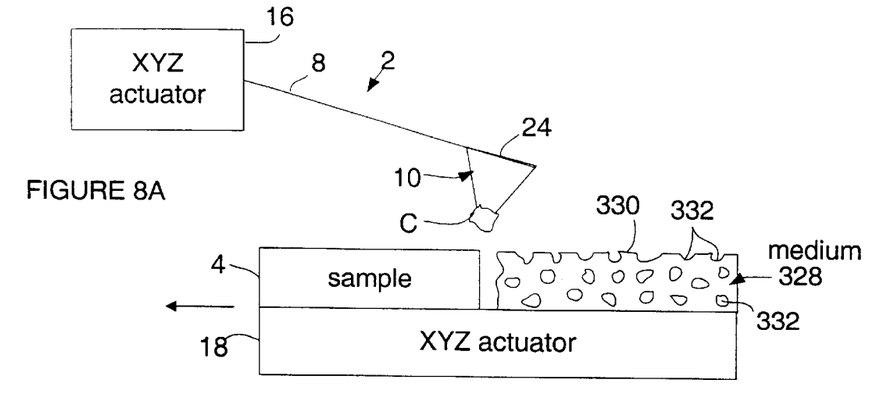
FIGS. 8A–8C schematically illustrate a second practical implementation of the embodiment of FIGS. 6A–6C.
Figure 8B:
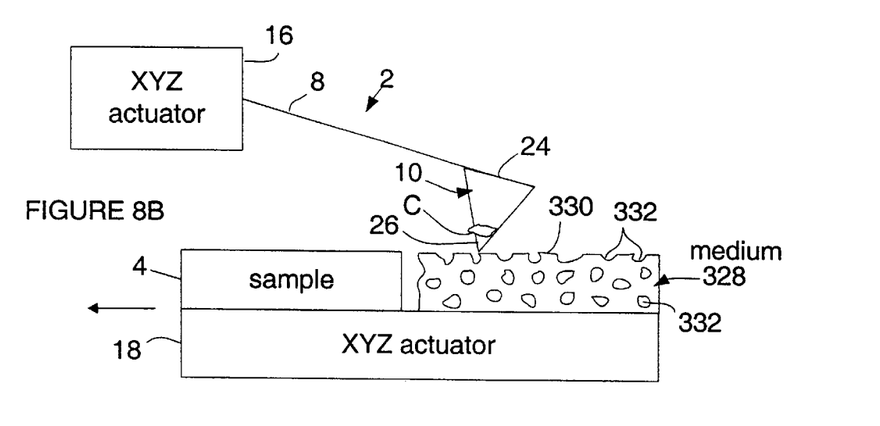
Figure 8C:
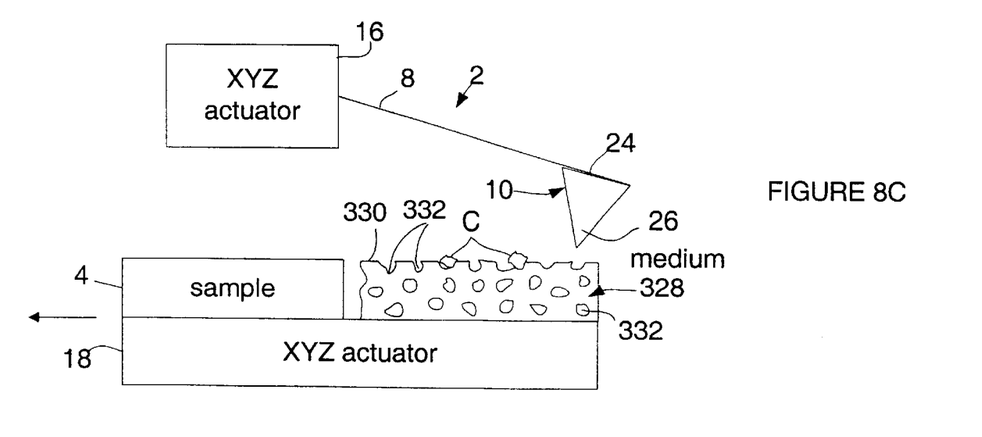

Another example of this wiping technique is illustrated in FIGS. 8A–8C, in which the cleaning medium 328 comprises a porous structure such as a porous rubber material. The tip 10 can be cleaned using a material of this type by positioning the tip 10 over a flat region 330 of the medium 328 between adjacent pores 332, and scanning across the cleaning medium's surface 330 in contact mode. The force on the tip can be controlled through the choice of the setpoint. The setpoint is the cantilever deflection maintained by the feedback loop, so a larger setpoint corresponds to bigger applied forces and more aggressive cleaning while smaller setpoint corresponds to less aggressive cleaning. As the tip 10 moves into and out of the indentations formed by the pores 332, the sides of these indentations scrape contaminants C from at least the pointed end portion 26 of the tip 10. In a variant of this embodiment, a ribbed medium of rubber or another relatively flexible material could be used in place of the porous rubber medium of FIGS. 8A–8C. In this variant (not shown), the ribs extend upwardly from the surface of the material, and the tip 10 is initially positioned on top of one of the ribs before implementing contact mode operation to wipe contaminants from the tip 10.

Figure 9A:
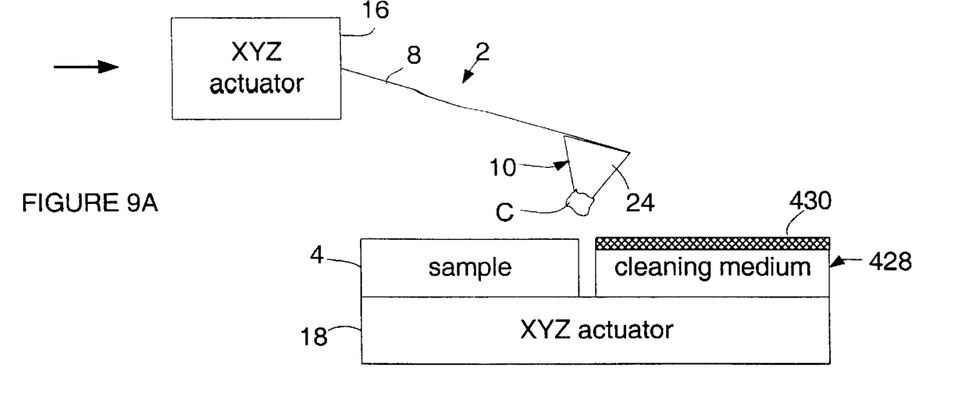
FIGS. 9A–9C schematically illustrate a tip cleaning processes utilizing the adhesive characteristics of a sticky surface to pull contaminants from the tip.
Figure 9B:
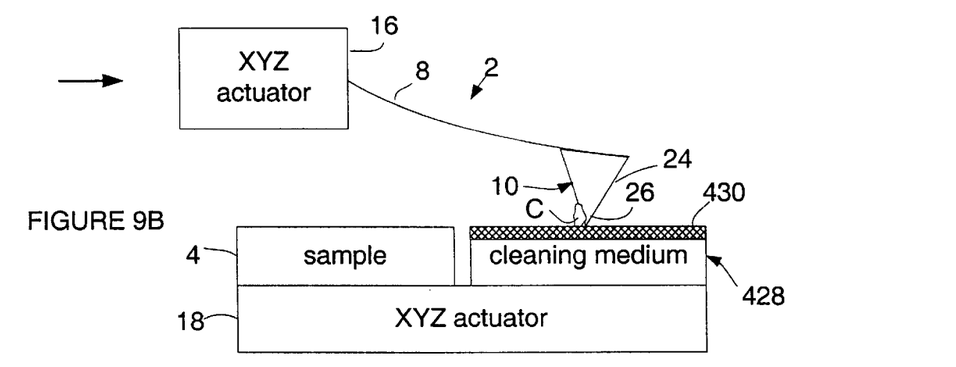
Figure 9C:
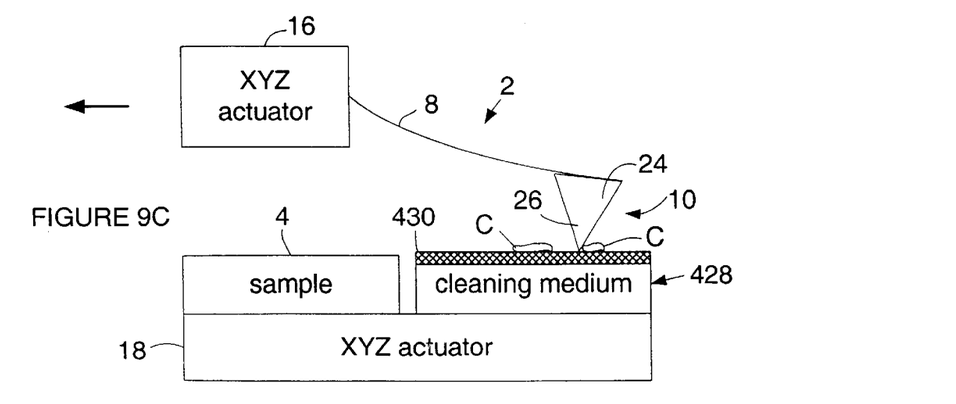

The tip 10 can also be cleaned during lateral tip movement without relying on the scraping action of surface features on the cleaning medium. For instance, if the cleaning medium has a "sticky" surface formed from a gel, a gel-like substance, an adhesive, or any other substance for which contaminants have a greater affinity than the tip, the tip can be cleaned simply by moving the tip across the sticky surface in contact mode so that the contaminants adhere to the sticky substance and are pulled from the tip. This technique is illustrated in FIGS. 9A through 9C, in which the tip 10 is cleaned using a material of this type by positioning the tip 10 over a sticky surface 430 of the medium 428, setting the tip's vertical deflection to a slight negative value (as is usual for contact mode imaging), and scanning the tip 10 across the cleaning medium's sticky surface 430 in contact mode. As the tip 10 moves over the sticky surface 430, contaminants C are pulled from the tip 10 and adhere to the sticky surface.

It must be emphasized that the above are just some of the examples of techniques via which a probe tip can be cleaned automatically by proper operation of a probe-based instrument. Other possibilities abound. For example, the tip could be driven to move over, but not necessarily in physical contact with, an attractive substance that relies on electromagnetic, electrostatic, or other attractive forces to pull contaminants from the tip. A tip could also be cleaned by ramming the tip into the surface of a cleaning medium and rotating the cleaning medium or tip while the tip is imbedded in the surface of the cleaning medium. Still other permutations of tip cleaning will become apparent from the appended claims.

I claim:

1. A method of cleaning a tip of a probe-based instrument, the probe of said instrument comprising a tip that interacts with a sample to acquire data concerning a surface characteristic of said sample, said tip having a base mounted on a support and a pointed end portion located opposite said base, said method comprising:
   (A) acquiring data from at least a portion of a test region of said sample by effecting relative probe/sample movement within said test region and monitoring interaction between said probe and said sample; and
   (B) cleaning said tip by controlling operation of said instrument to cause relative probe/sample movement that results in tip interaction with a cleaning medium that removes contaminants from at least said pointed end portion of said tip.

2. A method as defined in claim 1, wherein said cleaning medium is a portion of said sample.

3. A method as defined in claim 2, wherein said portion of said sample is spaced from said test region.

4. A method as defined in claim 2, wherein said portion of said sample is located in said test region.

5. A method as defined in claim 2, wherein said cleaning step comprises ramming said tip into a surface of said portion of said sample.

6. A method as defined in claim 5, further comprising at least substantially preventing lateral movement between said tip and said sample during the ramming step.

7. A method as defined in claim 5, further comprising effecting lateral movement between said tip and said sample during the ramming step.

8. A method as defined in claim 2, wherein said sample is formed from a material that is softer than said tip.

9. A method as defined in claim 1, wherein said cleaning region is spaced from said sample and said cleaning medium is made from a material that is different from a material of said sample.

10. A method as defined in claim 9, wherein said cleaning medium comprises one of a metal, a plastic, a rubber, a rubber-like substance, a bristly substance, a sticky substance, and a solvent.

11. A method as defined in claim 1, wherein the cleaning step comprises wiping said tip laterally across a surface of said cleaning medium so that features on said surface scrape contaminants from at least said pointed end portion of said tip.

12. A method as defined in claim 11, wherein said cleaning medium has a rubber surface and said features comprise one of 1) areas between pores in said rubber surface and 2) ribs on said rubber surface.

13. A method as defined in claim 11, wherein said cleaning medium comprises a brush and said features comprise bristles of said brush.

14. A method as defined in claim 1, wherein the cleaning medium has a sticky surface for which contaminants have a greater affinity than said tip, and wherein the cleaning step comprises moving said tip laterally across said sticky surface so that contaminants are pulled from said tip and adhere to said sticky surface.

15. A method as defined in claim 1, wherein the step of effecting relative probe/sample movement comprises translating said probe while holding said sample stationary.

16. A method as defined in claim 1, wherein the cleaning step is performed automatically during a data acquisition process, and wherein data acquisition is interrupted during the cleaning step and is resumed following the cleaning step.

17. A method as defined in claim 1, wherein said probe further comprises a cantilever having a fixed end, and a free end on which said base of said tip is mounted.

18. A method of cleaning a tip of a probe of an atomic force microscope (AFM), said probe comprising 1) said tip and 2) a cantilever having a fixed end coupled to a support and having a free end, said tip having a base mounted on said free end of said cantilever and having a pointed end portion located opposite said base, said method comprising:
 (A) automatically acquiring data from at least a portion of a scanned area of a sample by effecting relative probe/sample movement within said scanned area and monitoring interaction between said probe and said sample; and then
 (B) automatically cleaning said tip by causing relative probe/sample movement that results in tip interaction with a cleaning medium that removes contaminants from at least said pointed end portion of said tip.

19. A method as defined in claim 18, wherein said cleaning region is located on said sample and said cleaning medium is a portion of said sample.

20. A method as defined in claim 19, wherein said portion of said sample is spaced from said scanned area.

21. A method as defined in claim 19, wherein said portion of said sample is located in said scanned area.

22. A method as defined in claim 19, wherein the cleaning step comprises ramming said tip into said surface of said sample while at least substantially preventing lateral movement between said probe and said sample.

23. A method as defined in claim 19, wherein the cleaning step comprises ramming said tip into said surface of said sample and effecting lateral movement between said probe and said sample.

24. A method as defined in claim 19, wherein said sample is formed from a material that is softer than said tip.

25. A method as defined in claim 18, wherein said cleaning medium comprises a material that is different from a material of said sample.

26. A method as defined in claim 25, wherein said cleaning medium comprises one of a metal, a plastic, a rubber, a rubber-like substance, a bristly substance, a sticky substance, and a solvent.

27. A method as defined in claim 18, wherein the cleaning step comprises wiping said tip laterally across a surface of said cleaning medium so that features on said surface scrape contaminants from at least said pointed end portion of said tip.

28. A method as defined in claim 27, wherein said cleaning medium has a rubber surface and said features comprise one of 1) areas between pores in said rubber surface and 2) ribs on said rubber surface.

29. A method as defined in claim 27, wherein said cleaning medium comprises a brush and said features comprise bristles of said brush.

30. A method as defined in claim 18, wherein the cleaning medium has a sticky surface for which contaminants have a greater affinity than said tip, and wherein the cleaning step comprises moving said tip laterally across said sticky surface so that contaminants are pulled from said tip and adhere to said sticky surface.

31. A method as defined in claim 18, further comprising automatically resuming scanning of said scanned area following the cleaning step.

32. A method of cleaning a tip of a probe of an atomic force microscope (AFM), said probe comprising 1) said tip and 2) a cantilever having a free end on which said tip is mounted and having a fixed end, said tip including a base mounted on said free end of said cantilever and a pointed end portion located opposite said base, said method comprising:
 (A) effecting a data scan by automatically acquiring data from a scanned area of a sample by effecting relative probe/sample movement within said scanned area while monitoring interaction between said probe and said sample; then
 (B) automatically cleaning said tip by causing relative probe/sample movement that results in 1) probe repositioning from said scanned area to a cleaning region which is spaced from said scanned area and in which a cleaning medium is located and 2) causing said tip to interact with said cleaning medium so as to remove contaminants from at least said pointed end portion of said tip; and then
 (C) automatically resuming said data scan by 1) effecting probe/sample movement to reposition said probe over said scanned area and then 2) acquiring data from said scanned area by effecting relative probe/sample movement within said scanned area while monitoring interaction between said probe and said sample.

33. A method as defined in claim 32, wherein said tip is formed from diamond.

34. A method as defined in claim 32, wherein said cleaning medium comprises a portion of said sample.

35. A method as defined in claim 32, wherein said cleaning medium is located adjacent said sample and is formed from a different material than said sample.

36. A method comprising:
 (A) providing an atomic force microscope including
  (1) a computer;
  (2) an actuator assembly which receives energization power under control of said computer; and
  (3) a probe including
   (a) a cantilever which is formed from a material that is stiffer than silicone and which has i) a fixed end coupled to said actuator assembly and ii) a free end, and
   (b) a diamond tip which is mounted on said free end of said cantilever and which has i) a base mounted on said free end of said cantilever and ii) a pointed end portion located opposite said base;
 (B) automatically acquiring data from a scanned area of a sample by energizing said actuator assembly to drive said probe over said scanned area while monitoring interaction between said probe and said sample; then
 (C) automatically cleaning said tip by energizing said actuator assembly to 1) move said probe away from said scanned area and into a cleaning region and to 2)

drive said tip into contact with a cleaning medium so as to remove contaminants from at least said pointed end portion of said tip; and then (D) automatically resuming data acquisition by 1) energizing said actuator assembly to reposition said probe over said scanned area and then 2) acquiring data from said scanned area by monitoring interaction between said probe and said sample.

37. A probe based instrument comprising:

(A) a probe including a tip having a base and a pointed end portion located opposite said base;

(B) an actuator assembly that is coupled to at least one of said probe and a sample support and that effects relative movement between said probe and a sample mounted on said sample support;

(C) a sensor that acquires data concerning a surface characteristic of the sample by monitoring interaction between said probe and the sample during relative probe/sample movement within a test region; and (D) means for cleaning at least said pointed end portion of said tip by driving said actuator assembly to effect relative probe/sample movement that results in tip interaction with a cleaning medium that removes contaminants from at least said pointed end portion of said tip.

38. An instrument as defined in claim 37, wherein said cleaning medium is a portion of the sample.

39. An instrument as defined in claim 37, wherein the cleaning medium comprises a material that is separate from the sample.

40. An instrument as defined in claim 37, wherein the cleaning medium comprises one of a metal, a plastic, a rubber, a rubber-like substance, a bristly substance, a sticky substance, and a solvent.

41. An instrument as defined in claim 37, wherein said means for cleaning causes said actuator assembly to move said tip laterally across a surface of the cleaning medium so that features on the surface scrape contaminants from at least said pointed end portion of said tip.

42. An instrument as defined in claim 37, wherein said means for cleaning causes said actuator assembly to move said tip laterally across a sticky surface for which contaminants have a greater affinity than said tip so that contaminants are pulled from said tip and adhere to said sticky surface.

43. An instrument as defined in claim 37, wherein said instrument is an atomic force microscope and said probe further comprises a cantilever having a fixed end and a free end on which said base of said tip is mounted.

44. An atomic force microscope comprising:

(A) a computer;

(B) an actuator assembly that receives energization power under control of said computer;

(C) a probe including
  (1) a cantilever which is formed from a material that is stiffer than silicon and which has i) a fixed end coupled to said actuator and ii) a free end, and
  (2) a diamond tip which has i) a base mounted on said free end of said cantilever and ii) a pointed end portion located opposite said base; and (D) a sensor configured to monitor probe/sample interaction, wherein said computer is operable, based on data received from said sensor, to
  (1) automatically acquire data from a scanned area of a sample by energizing said actuator to drive said probe over said scanned area while monitoring interaction between said probe and the sample, then
  (2) automatically clean at least said pointed end portion of said tip by energizing said actuator to move said probe away from said scanned area and to drive said tip into contact with a cleaning medium so as to remove contaminants from said tip; and then
  (3) automatically resume data acquisition by a) energizing said actuator to reposition said probe over said scanned area and then b) acquiring data from said scanned area by monitoring interaction between said probe and the sample.

* * * * *